United States Patent
Horiyama et al.

(10) Patent No.: US 6,823,443 B2
(45) Date of Patent: Nov. 23, 2004

(54) DATA DRIVEN TYPE APPARATUS AND METHOD WITH ROUTER OPERATING AT A DIFFERENT TRANSFER RATE THAN SYSTEM TO ATTAIN HIGHER THROUGHPUT

(75) Inventors: Takashi Horiyama, Nara (JP); Kohichi Hatakeyama, Nara (JP); Tsuyoshi Muramatsu, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 566 days.

(21) Appl. No.: 09/846,301

(22) Filed: May 2, 2001

(65) Prior Publication Data

US 2001/0044890 A1 Nov. 22, 2001

(30) Foreign Application Priority Data

May 22, 2000 (JP) ......................................... 2000-149467

(51) Int. Cl.[7] .............................................. G06F 13/00
(52) U.S. Cl. .......................................... 712/201; 712/25
(58) Field of Search .................................. 712/201, 25

(56) References Cited

U.S. PATENT DOCUMENTS

| | | | | |
|---|---|---|---|---|
| 4,591,979 A | * | 5/1986 | Iwashita | 712/25 |
| 4,814,978 A | * | 3/1989 | Dennis | 712/201 |
| 4,907,187 A | * | 3/1990 | Terada et al. | 712/201 |
| 5,373,204 A | | 12/1994 | Muramatsu et al. | |

FOREIGN PATENT DOCUMENTS

JP a683731 3/1994

OTHER PUBLICATIONS

Nishikawa et al., "A Data–Driven Implementation of Telecommunication Network Systems," Proceedings of the Third International Symposium on Autonomous Decentralized Systems, IEEE, pp. 51–58, Apr. 1997.*
Biagi, "The internal bottleneck: Terabit switch routers are coming of age," http://telephonyonline.com/ar/telecom__internal__bottleneck__terabit/ , Dec. 7, 1998.*
L3 Communications, "PCM Tutorial, Time Division Multiplexing," http://www.I–3com.com/TE/tech/pcm3.html, Mar. 20, 2000.*

* cited by examiner

*Primary Examiner*—Henry W. H. Tsai
(74) *Attorney, Agent, or Firm*—Birch, Stewart, Kolasch & Birch, LLP

(57) ABSTRACT

A router is formed by an M-input, 1-output junction unit and a 1-input, N-output branching unit. Where M and N satisfy the relation of (M>N), the transfer rate of a path between the junction unit and the branching unit is made the total sum of the transfer rates of inputs of IN1 to INM, whereby N times faster transfer becomes possible.

11 Claims, 15 Drawing Sheets

FIG.6 PRIOR ART
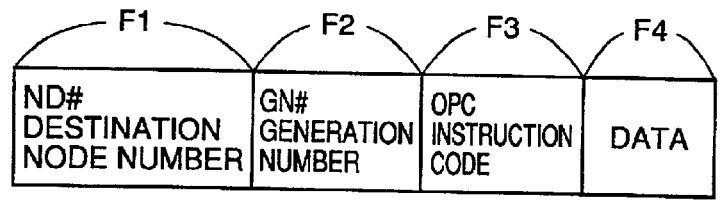
FIG.7 PRIOR ART
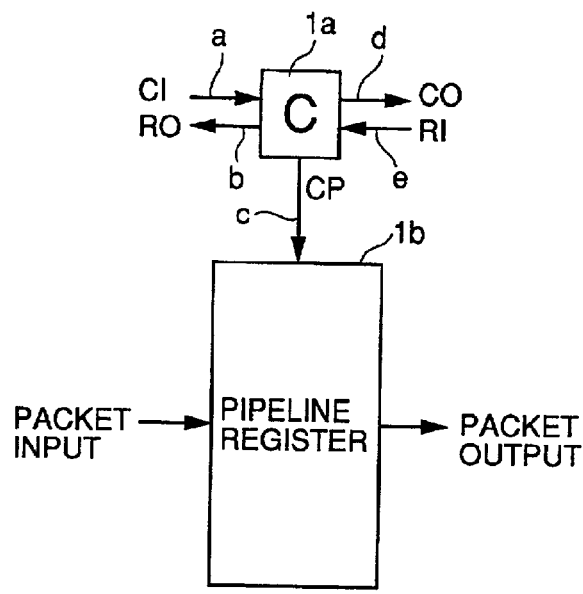
FIG.8A PRIOR ART CI
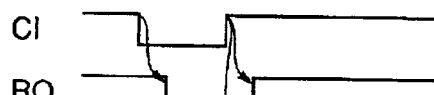
FIG.8B PRIOR ART RO
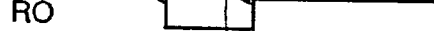
FIG.8C PRIOR ART CP
FIG.8D PRIOR ART CO
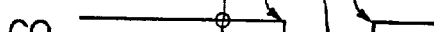
FIG.8E PRIOR ART RI

DATA DRIVEN TYPE APPARATUS AND METHOD WITH ROUTER OPERATING AT A DIFFERENT TRANSFER RATE THAN SYSTEM TO ATTAIN HIGHER THROUGHPUT

BACKGROUND OF THE INVENTION

1. Field of the Invention

The present invention relates to a data driven type information processing apparatus and to a method of controlling execution thereof. More specifically, the present invention relates to a data driven type information processing apparatus and the method of controlling execution thereof, in which transfer rate of a self-synchronous control circuit in a router as a relay apparatus on a communication network is made different from the rate of the data driven type information processing apparatus.

2. Description of the Background Art

In a data driven type information processing apparatus (hereinafter referred to as a data driven type processor), a process proceeds in accordance with the rule that when input data necessary for executing a certain process are all prepared, and resources including an arithmetic processor necessary for that process are allocated, the process is executed. A data processing apparatus including information processing operation of the data driven type uses a data transmitting apparatus employing asynchronous handshake method. In such a data transmitting apparatus, a plurality of data transmission paths are connected, and the data transmission paths transmit/receive data transmission request signals (hereinafter referred to as SEND signals) and transfer acknowledge signals (hereinafter referred to as ACK signals) indicating whether data transfer is permitted or not, with each other, whereby autonomous data transfer is performed.

FIG. 6 represents a data packet format applied to the prior art and to the present invention. Referring to FIG. 6, a data packet includes a destination node number field F1 storing a destination node number ND#; a generation number field F2 storing a generation number GN#; an instruction code field F3 storing an instruction code OPC; and a data field F4 storing data DATA. The generation number is a number for distinguishing data groups to be processed in parallel from each other. The destination node number is a number for distinguishing input data of the same generation from each other. The instruction code is for executing an instruction stored in an instruction decoder.

FIG. 7 is a block diagram showing a configuration of the data transmission path. The data transmission path includes a self-synchronous type transfer control circuit (hereinafter referred to as a C element) $1a$, and a data holding circuit (hereinafter referred to as a pipeline register) $1b$ including a D type flip-flop. The C element $1a$ has a pulse input terminal CI receiving a pulse; a transfer acknowledge output terminal RO outputting a transfer acknowledge signal indicating permission or inhibition of transfer; a pulse output terminal CO outputting a pulse; a transfer acknowledge input terminal RI receiving the transfer acknowledge signal indicating permission or inhibition of transfer; and a pulse output terminal CP for providing a clock pulse controlling data holding operation of pipeline register $1b$.

FIGS. 8A to 8E are timing charts representing the operation of the C element shown in FIG. 7. The C element $1a$ receives a pulse shown in FIG. 8A from terminal CI, and when the input transfer acknowledging signal such as shown in FIG. 8E provided from terminal RI represents a transfer permitted state, it outputs a pulse shown in FIG. 8D from terminal CO, and outputs a pulse shown in FIG. 8C to pipeline register $1b$. In response to the pulse applied from C element $1a$, pipeline register $1b$ holds the applied input packet data, or provides the held data as an output packet data.

FIG. 9 is a block diagram showing the data transmission path shown in FIG. 7 connected sequentially through a prescribed logic circuit. Referring to FIG. 9, an input packet data is transferred in the order of pipeline registers $3a \rightarrow 3b \rightarrow 3c$, while sequentially processed by logic circuits $3d$ and $3e$. When pipeline register $3a$ is in a data holding state, for example, and the succeeding pipeline register $3b$ is in the data holding state, data is not transmitted from pipeline register $3a$ to pipeline register $3b$.

When the succeeding pipeline register $3b$ is in a state not holding data, or when it enters a state not holding data, the data is transmitted from pipeline register $3a$, processed by logic circuit $3d$ and fed to pipeline register $3b$ with at least a preset delay time. Such a control in which data is transferred asynchronously with at least a preset delay time, in accordance with the SEND signal input/output at CI and CO terminals and ACK signals input/output at RI and RO terminals between adjacent connected pipeline registers is referred to as a self-synchronous transfer control, and a circuit controlling such a data transfer is referred to as a self-synchronous transfer control circuit.

FIG. 10 is a specific circuit diagram of the C element shown in FIG. 7. The C element is described, for example, in U.S. Pat. No. 5,373,204. Referring to FIG. 10, pulse input terminal CI receives a pulse-shaped SEND signal (transfer request signal) from a preceding stage, and a transfer acknowledge output terminal RO provides the ACK signal (transfer acknowledge signal) to the preceding stage. Pulse output terminal CO provides the pulse-shaped SEND signal to a succeeding stage, and the transfer acknowledge input terminal RI receives the ACK signal from the succeeding stage.

A master reset input terminal MR receives a master reset signal. When a pulse at the "H" (high) level is applied to master reset input terminal MR, it is inverted by an inverter $4e$, flip-flops $4a$ and $4b$ are reset, and the C element is initialized. Pulse output terminal CO and transfer acknowledge output terminal RO both output the "H" level signals as the initial state. That the output of transfer acknowledge output terminal RO is at the "H" level indicates the transfer permitted state, whereas the output being at the "L" level indicates a transfer inhibited state. The output of pulse output terminal CO being the "H" level represents a state in which data transfer from the succeeding stage is not requested, while the output being at the "L" level represents a state in which data transfer is requested or data is being transferred from the succeeding stage.

When the "L" level signal is input to pulse input terminal CI, that is, when a data transfer request is issued from the preceding stage, flip-flop $4a$ is set, and provides the "H" level signal at its output Q. The "H" level signal is inverted by inverter $4d$, whereby the "L" level signal is output from transfer acknowledge input terminal RO, inhibiting further data transfer.

After a prescribed time period, the "H" level signal is input to pulse input terminal CI, and data set from the preceding stage to the C element is completed. When, in this state, the "H" level signal is input from transfer acknowledge input terminal RI, that is, data transfer is permitted by the succeeding stage, and in addition, the "H" level signal is output from pulse output terminal CO, that is, when data is not being transferred to the succeeding stage (data transfer request is not issued to the succeeding stage), then NAND gate 4c is rendered active, providing the "L" level signal.

As a result, flip-flop 4b is reset, and flip-flop 4b provides the "H" level signal from pulse output terminal CP to the pipeline register through a delay element 4g, and provides the SEND signal at the "L" level from pulse output terminal CO to the C element of the succeeding stage through a delay element 4f. More specifically, data transfer request is issued to the succeeding stage. The C element of the succeeding stage, receiving the SEND signal at the "L" level, outputs the ACK signal set to the "L" level, representing transfer inhibition, from the RO terminal, so as to prevent further data transfer to the C element. The C element receives the ACK signal at the "L" level from the transfer acknowledge input terminal RI, and by this signal, flip-flop 4b is reset. As a result, the "L" level signal is output from pulse output terminal CP to the pipeline register through delay element 4g, and the SEND signal at the "H" level is output from the pulse output terminal CO to the succeeding stage through delay element 4f, and thus data transfer is completed.

FIG. 11 is a schematic block diagram of a conventional data driven type information processing apparatus implemented including the data transfer path shown in FIG. 9. Referring to FIG. 11, the data driven type information processing apparatus Pe includes a junction unit JNC, a firing control unit FC, a processing unit FP, a program storing unit PS, a branching unit BRN, a plurality of pipeline registers 3a to 3c and a plurality of C elements 2a to 2c. Respective C elements 2a to 2c control packet transfer with the corresponding processing units (FC, FP, PS) by exchanging packet transfer pulses (signals at CI, CO, RI and RO) between the C elements of the preceding and succeeding stages. Respective pipeline registers 3a to 3c take in and hold data input from the processing unit of the preceding stage in response to the pulse inputs from corresponding C elements 2a to 2c, feed the data to the output stage, and hold the data until the next pulse is input.

Referring to FIG. 11, when the data packet shown in FIG. 6 is input to the processor Pe, the input packet is first passed through junction unit JNC, transmitted to firing control unit FC, and a data pair is formed between packets having the same destination node number and the same generation number. More specifically, two different data packets having identical node number and the generation number are detected, and of these two having the same numbers, one data packet is additionally stored in the data field F4 (FIG. 6) of the other data packet, and the resulting data packet is output.

The data packet storing the data pair (a set of data) in the data field F4 is then transmitted to operating unit FP. The operating unit FP receives the transmitted data packet as an input, based on the instruction code OPC of the input packet, performs a prescribed operation on the contents of the input packet, and stores the result of operation in the data field F4 of the input packet. Thereafter, the input packet is transmitted to program storing unit PS.

The program storing unit receives as an input the transmitted data packet, and reads, based on the destination node number ND# of the input packet, the node information (node number ND#) to which the packet should go, instruction information (instruction code OPC) to be executed next, and a copy flag CPY, from the program memory of the program storing unit PS. The read destination node number ND# and the instruction code OPC are stored in the destination node number field F1 and the instruction code field F3 of the input packet, respectively.

A packet output from program storing unit PS is output from the processor PE or again returned to the processor PE through a router, not shown, based on the destination node number ND#. The router is used for data packet exchange between the above described data driven type processors PEs and for input control and output control of data packets to a data driven type processor PE.

FIG. 12 is a block diagram showing an example of use of the router. In the configuration shown in FIG. 12, a plurality of data driven type processors PEs shown in FIG. 11 are connected through a router 5. When none of the data driven type processors performs a process, an input data is output as it is through router 5. When a process proceeds in the order of processor PE1→PE1→PE3→PE2, the input data is first provided from router 5→5a to processor PE1, the data processed by processor PE1 is again input to processor PE1 through 5b→router 5 and again through 5a, the data processed by processor PE1 is fed to processor PE3 through 5b →router 5→5f, the data processed by processor PE3 is input to processor PE2 through 5e→router 5→5c, and the data processed by processor PE2 is output through 5d →router 5.

FIG. 13 is a block diagram of a 2×2 router used in a conventional data driven type processor. Referring to FIG. 13, the router is a 2-input, 2-output router including two branching units 6a and 6b and two junction units 6c and 6d. In the router, switching of data packets takes place, in which there are a total of four paths in the 2×2 router. Namely, the data packet input to IN1 may be output from OUT1 or OUT2, and the data packet input to IN2 may be output from OUT1 or OUT2. Not only this router but also other routers described in the present invention do not guarantee that two or more inputs input simultaneously are all output simultaneously from the same output.

More specifically, in the example of FIG. 13, such an event is not guaranteed in that the data packets input simultaneously to IN1 and IN2 are both output from OUT1 or both output from OUT2.

Referring to FIG. 13, when a data packet input through IN1 is routed to OUT2 and the data packet input through IN2 is routed to OUT1, the data packet input through IN1 passes from branching unit 6a through a path 6e and transferred to junction unit 6d and output from OUT2. The data packet input through IN2 is passed from branching unit 6b through a path 6f, transferred to junction unit 6c and output from OUT1.

FIG. 14 is a circuit diagram showing an example of the branching unit shown in FIG. 13, and FIG. 15 is a circuit diagram showing an example of the branching unit shown in FIG. 2.

In FIG. 14, the branching unit is configured to have one input and two outputs, and a data packet input to the branching unit is branched to either one of the two outputs. Two junction units 6c and 6d are connected in the succeeding stage as shown in FIG. 13. Handshaking with the junction unit 6c is performed at COa and RIa, and handshaking with the junction unit 6d is performed at COb and RIb, through JTCL circuit 8, which is a control circuit controlling junction as shown in FIG. 16. Whether a data packet is to be transferred to junction unit 6c or 6d is switched by a branch permitting signal BE. As will be described with reference to FIG. 16 later, the junction unit also includes a C element.

In the branching unit shown in FIG. 14, one of the counter part C elements (C elements in the junction units 6c and 6d of the succeeding unit shown in FIG. 13) for handshaking is selected by the branch permitting signal BE. Namely, the branch destination of the data packet input to the branching unit is determined. When the branch permitting signal BE is at the "L" level, NAND gate 7c attains active, the output of pulse output terminal CO of C element 7a is output to the terminal CIa on the side of junction unit 6c, and the data packet in a pipeline register 7b is output to the pipeline register on the side of the junction unit 6c in the succeeding stage.

On the contrary, when the branch signal BE is at the "H" level, NAND gate 7d attains active, the output of the pulse output terminal CO of C element 7a is output to the terminal CIb on the side of junction unit 6d, and the data packet in pipeline register 7b is output to the pipeline register on the side of the branching unit 6d in the succeeding stage. Transfer acknowledge signals RIa and RIb from two C elements of the succeeding stage are input to AND gate 7e, and the output thereof is input to RI of C element 7a.

FIG. 15 is a circuit diagram representing an example of the branching unit having one input and four outputs, used for forming a router. Referring to FIG. 15, at this branching unit, branch destination of a data packet is determined by branch permitting signals BEa and BEb. More specifically, when branch permitting signals BEa and BEb are both at the "L" level, NAND gate 7f attains active, an output of pulse output terminal CO of C element 7a is output from COa, and the data packet in pipeline register 7b is output to the pipeline register on the side of COa and RIa of the junction unit 6c in the succeeding stage.

Similarly, when branch permitting signal BEa is at the "H" level and the branch permitting signal BEb is at the "L" level, the data packet is output to COb of the junction unit of the succeeding stage; when branch permitting signal BEa is at the "L" level and the branch permitting signal BEb is at the "H" level, the data packet is output to COc of the junction unit in the succeeding stage; and when branch permitting signals BEa and BEb are both at the "H" level, the CO output of C element 7a is output to COd of the succeeding stage, and, in the similar manner as described above, the data packet is transferred to one of the junction units.

The branch instruction signals RIa, RIb, RIc and RId of the four C elements in the succeeding stage are input to AND gate 7j, and an output thereof is input to RI of C element 7a.

FIG. 16 is a circuit diagram representing an example of the junction unit shown in FIG. 13. The junction unit shown in FIG. 16 is configured to have two inputs and one output and includes a JCTL circuit 8, which is a control circuit controlling junction such that simultaneous output is prevented when there are two simultaneous inputs. JCTL circuit 8 controls such that a data packet from either one of pipeline registers 8a and 8b is output. More specifically, when the pulse output terminal CPa to pipeline register 8a of JCTL circuit 8 is at the "H" level, the select signal AEB of selector 8e attains to the "L" level, and the data packet in pipeline register 8a is output from selector 8e through pipeline register 8d.

Further, when the pulse output terminal CPb to pipeline register 8b of JCTL circuit 8 controlling junction is at the "H" level, select signal AEB of selector 8e attains to the "H" level, and the data packet in pipeline register 8b is output through selector 8e through pipeline register 8d. The control of pipeline register 8d is performed by C element 8c.

FIG. 17 is a circuit diagram of the JCTL circuit shown in FIG. 16. In FIG. 17, JCTL circuit 8 controls pulses output to pulse output terminals CPa and CPb to pipeline registers 8a and 8b corresponding to C elements 81a and 81b. More specifically, when the pulse output terminal CPa of C element 81a is at the "H" level, the output AEB of a flip-flop 81c, that is, the selected signal of selector 8e shown in FIG. 16 attains to the "L" level. When the pulse output terminal CPb of C element 81b is at the "H" level, the output AEB of flip-flop 81c, that is, select signal of selector 8e attains to the "H" level.

The conventional router is formed to have such a structure as the example of 2×2 shown in FIG. 13. When the number of data driven type processors to be connected increases in image processing, for example, and the number of processors increase, the processes become complicated. Further, as the speed of processing increases, a router having multiple inputs and multiple outputs is desirable. As an example of the router to meet such a demand, FIG. 18 shows a 4×4 router. In FIG. 18, the router includes four branching units 9a to 9d, junction units 10a to 10h joining outputs from the branching units 9a to 9d, and junction units 10i to 10l for further joining outputs of junction units 10a to 10h. As compared with the 2×2 router shown in FIG. 13, the circuit scale is clearly enlarged. As the number of inputs and outputs of the router increases, the circuit scale of router 5 increases explosively. Thus, a router that can cope with the demand of multi-inputs and multi-outputs and having a small circuit scale has become necessary.

FIG. 19 is a block diagram showing a 2×2 router with a small circuit scale. Referring to FIG. 19, the router is formed by one of the branching units shown in FIG. 14 and one of the junction units shown in FIG. 16, and there is one path 11c from junction unit ha to branching unit 11b. Here, at the one path 11c, the data input from IN1 and IN2 at the maximum transfer rate are joined. As the transfer rate of the path 11c is the same maximum transfer rate, when the data input at the maximum transfer rate are joined, the processing capacity is overloaded. As a result, in the configuration of the router shown in FIG. 19, input is possible only at such a transfer rates in that the sum of the transfer rates of the inputs from IN1 and IN2 is equal to or lower than the maximum transfer rate.

If inputs are provided at such a rate that is lower than the maximum transfer rate, the transfer rate of the output from OUT1 and OUT2 would be also lower than the maximum transfer rate. Conventionally, the configuration of the 2×2 router such as shown in FIG. 13 has been inevitable to enable routing at the maximum transfer rate without such restriction, though the circuit scale has been undesirably large.

In the future, however, a high speed transfer router that can maintain the maximum transfer rate at the junction path, namely, that can perform handshaking at a high speed, with the configuration shown in FIG. 19 suitable for multiple input-multiple-output router will be required. Thus, it is necessary to increase the speed of operation of the C elements for handshaking at the branching unit of the conventional router shown in FIG. 14 and the junction unit of FIG. 16.

Conventionally, the C element used has the same configuration as the C element used in the data driven type processor PE. The reason for this is that, to date, a 2×2 router has been sufficient, and that, as the data driven type information processing apparatus of such a type is generally designed by a CAD, it is efficient and reliable to use the same macro cell or an IP core, with the C element or a peripheral circuitry including the C element being registered as a macro cell or an IP core.

As the C element of identical configuration has been used, the following problem is experienced on the side of the data driven type processor, when the speed of operation of the C element is to be increased. More specifically, when the transfer rate of the C element is increased excessively, the amount that can processed by one stage of pipelines shown in FIG. 9, that is, from one pipeline register to a pipeline register of the succeeding stage, decreases, and therefore the process must be divided into pieces. For example, the amount to be processed by a logic circuit $3d$ between pipeline registers $3a$ and $3b$, or the amount to be processed by logic circuit $3e$ between pipeline registers $3b$ and $3c$ must be reduced. As a result, the number of stages of the pipelines increases while the amount to be processed is the same, and by the extra pipelines, the circuit scale increases. To avoid this problem, a high speed C element has been intentionally avoided in the data driven type processor.

SUMMARY OF THE INVENTION

Therefore, an object of the present invention is to provide a method and apparatus for controlling execution of a data driven type information processing apparatus in which increase in router circuit scale is suppressed without reducing an amount to be processed per one stage of pipelines, and in which transfer is possible without lowering the transfer rate of C element in the router unit from the maximum transfer rate.

Briefly stated, the present invention provides a data driven type information processing apparatus including: a router including an M-input, 1-output junction unit and a 1-input, N-output branching unit, controlling input/output of a data packet including at least a destination node number, an instruction code and data; and a self-synchronous type transfer control circuit generating a transfer request signal and a transfer acknowledge signal controlling transfer and operating processes of the data packet; wherein transfer rate used by the self-synchronous transfer control circuit of the router is different from the transfer rate used in the system.

In the conventional data driven type information processing apparatus, the speed of operation of the C element has been intentionally made slow. The router, however, is just a path not including an operator or a memory between the stages, unlike the pipelines. Therefore, it is unnecessary to intentionally suppress the transfer rate. Therefore, the C element of double rate, quadruple rate or any rate may be used. In the conventional router, the transfer rate at the junction was the same as the transfer rate before junction, and therefore it has been necessary to lower the rate of input to the junction unit to be lower than the maximum transfer rate. In the present invention, the transfer rate at the junction unit is doubled, and therefore, even by the router having only one path, input to the junction unit at the maximum transfer rate is possible, enabling output at the maximum transfer rate.

According to another aspect, the present invention provides a data driven type information processing apparatus including: a router including an M-input, 1-output junction unit and a 1-input, N-output branching unit, controlling input/output of a data packet including at least a destination node number, an instruction code and data; and a self-synchronous transfer control circuit generating a transfer request signal and a transfer acknowledge signal controlling transfer and operating processes of said data packet; in which transfer rate used in the self-synchronous control circuit in the router is different from the transfer rate used in the system.

In a preferred embodiment, in the router, the transfer rate used in the self-synchronous transfer control circuit of the router is multiple times the transfer rate used in the system.

In a preferred embodiment, the transfer rate used in the self-synchronous transfer control circuit of the router is a total sum of the transfer rates of the inputs to the router.

In a preferred embodiment, the transfer rate used in the self-synchronous transfer control circuit of the router is a total sum of the transfer rates of the outputs from the router.

In a more preferred embodiment, the transfer rate used in the self-synchronous transfer control circuit of the router is larger one of the total sum of the transfer rates of the inputs to the router and the total sum of the transfer rates of the outputs from the router.

In a more preferred embodiment, a plurality of such routers are combined.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows a data packet format.

FIG. 7 shows a data transfer path of a data driven type processor.

FIGS. 8A to 8E are timing charts of the C element.

DESCRIPTION OF THE PREFERRED EMBODIMENTS

Figure 1:
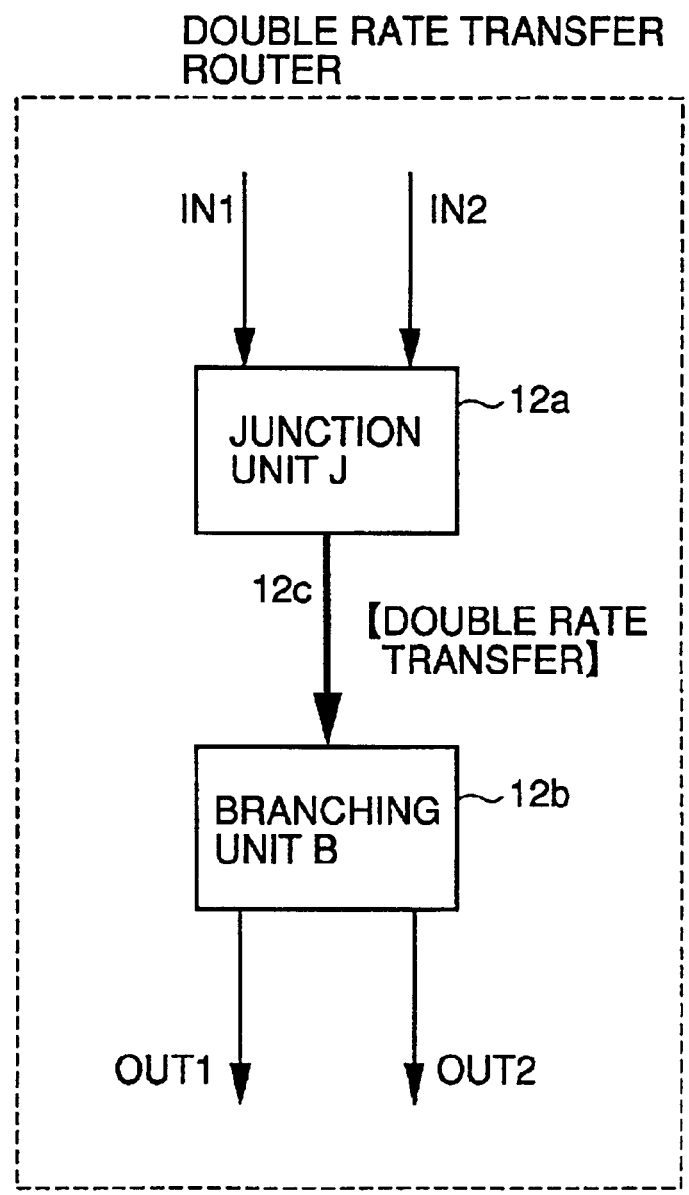
FIG. 1 is a block diagram showing a 2×2 double rate transfer router in accordance with one embodiment of the present invention.
Figure 14:
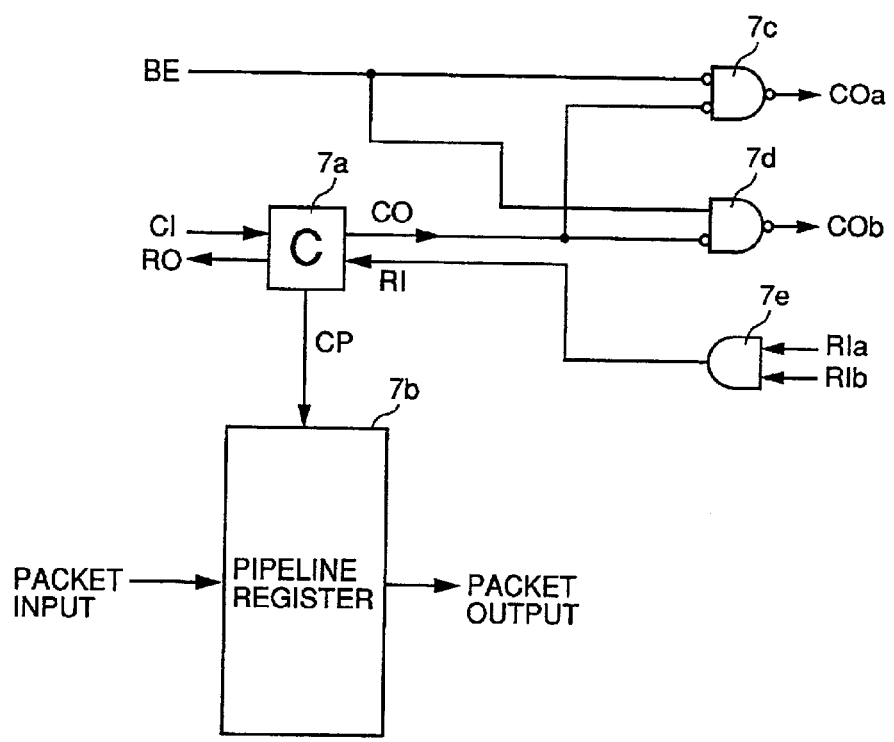
FIG. 14 is a circuit diagram of a 1-input, 2-output branching unit used in the router.

FIG. 1 is a block diagram showing a 2×2 double rate transfer router in accordance with one embodiment of the present invention. In the 2×2 router in accordance with the embodiment shown in FIG. 1, the transfer rate at the junction unit is made double the maximum transfer rate in the data driven type processor, namely, the transfer rate of the C element in the router is doubled. The router is a 2-input, 2-output router formed by one branching unit shown in FIG. 14 and one junction unit shown in FIG. 16. The router has 2×2=4 different paths.

Figure 10:
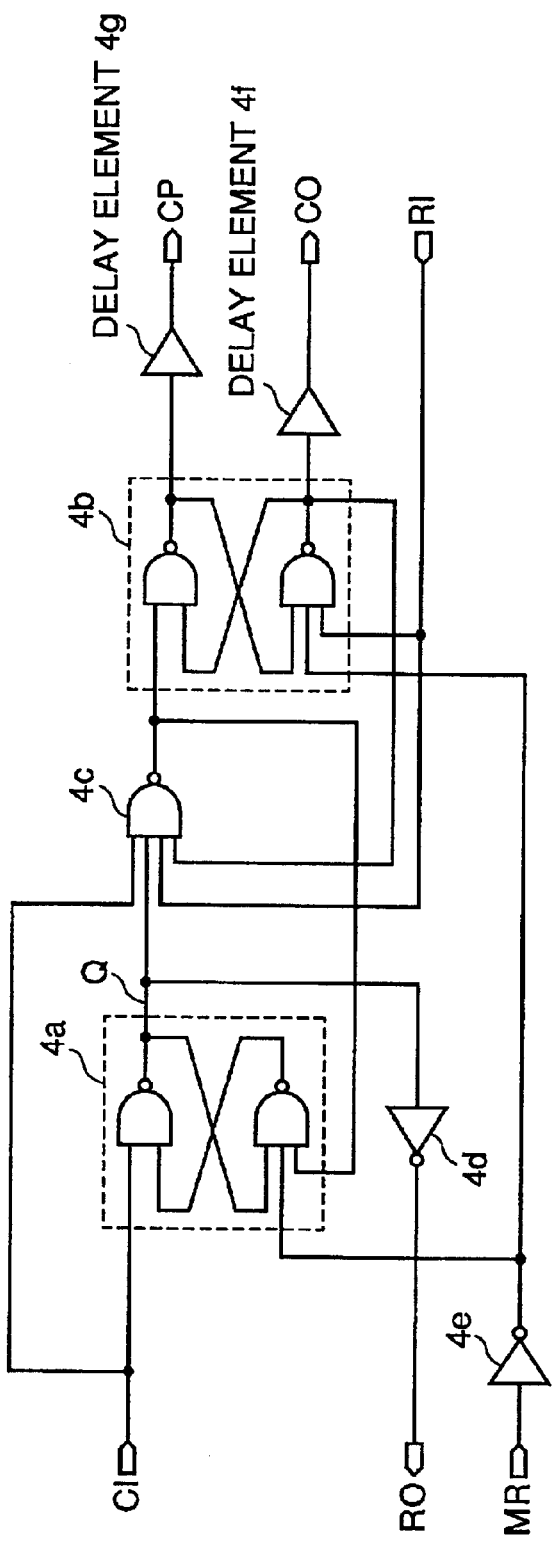
FIG. 10 is a circuit diagram of the C element.

In FIG. 1, the transfer rate of a path 12c is made double the input rate or output rate of the router. More specifically, the amount of delay provided by a delay element (delay element 4f shown in FIG. 10) on a SEND output line in the C element (C element 8c shown in FIG. 16) of junction unit 12 and the amount of delay provided by the delay amount 4f on the SEND output line in the C element (C element 7a shown in FIG. 14) of branching unit 12b are adjusted (for example, the number of stages of the inverter in delay element 4f is reduced to half the number of stages of the inverters in the delay elements of C element used in the data driven type processor), so that the transfer rate of the C element in the junction unit 12a and the transfer rate of the C element in the branching unit 12b is made double the maximum transfer rate of the data driven type processor.

Referring to FIG. 1, the data input to junction unit 12a at the maximum transfer rate from IN1 to IN2 are joined with the maximum transfer rate. As the transfer rate of path 12c is double the input rate or the output rate of the router, the data can be passed through the path 12c and transferred to branching unit 12b with the transfer rate not lower than the maximum transfer rate. The two input data are branched to OUT1 and OUT2 at branching unit 12b and as the C element in branching unit 12b has the double transfer rate, each of the data can be output at the maximum transfer rate.

Figure 13:
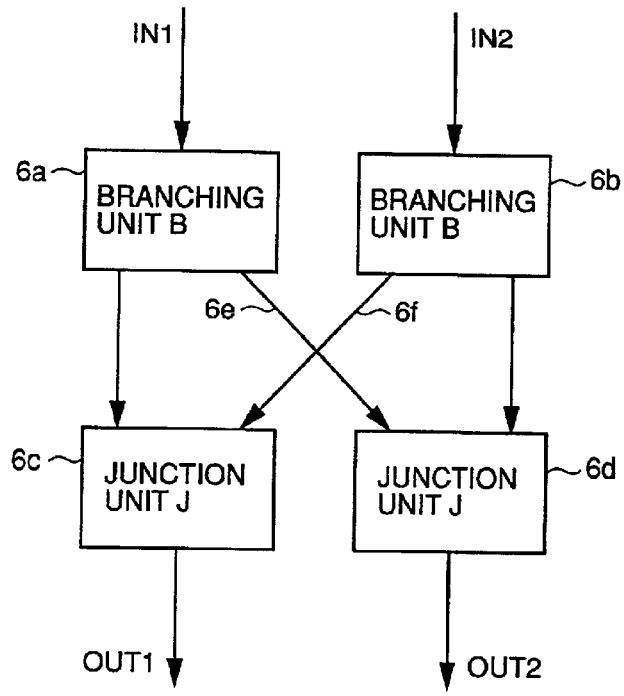
FIG. 13 is a block diagram of a 2×2 router.

As compared with the conventional 2×2 router shown in FIG. 13, the embodiment of the present invention provides the following advantages.

1) As there is only one junction unit and only one branching unit, circuit scale is not increased.

2) As the transfer rate in the router is doubled, input to the router and output from the router at the maximum transfer rate, not lowering the transfer rate, are possible.

3) As the delay element is formed by the inverters, increase in circuit scale can be avoided, and the delay elements can be formed easily in a simple manner.

Figure 2:
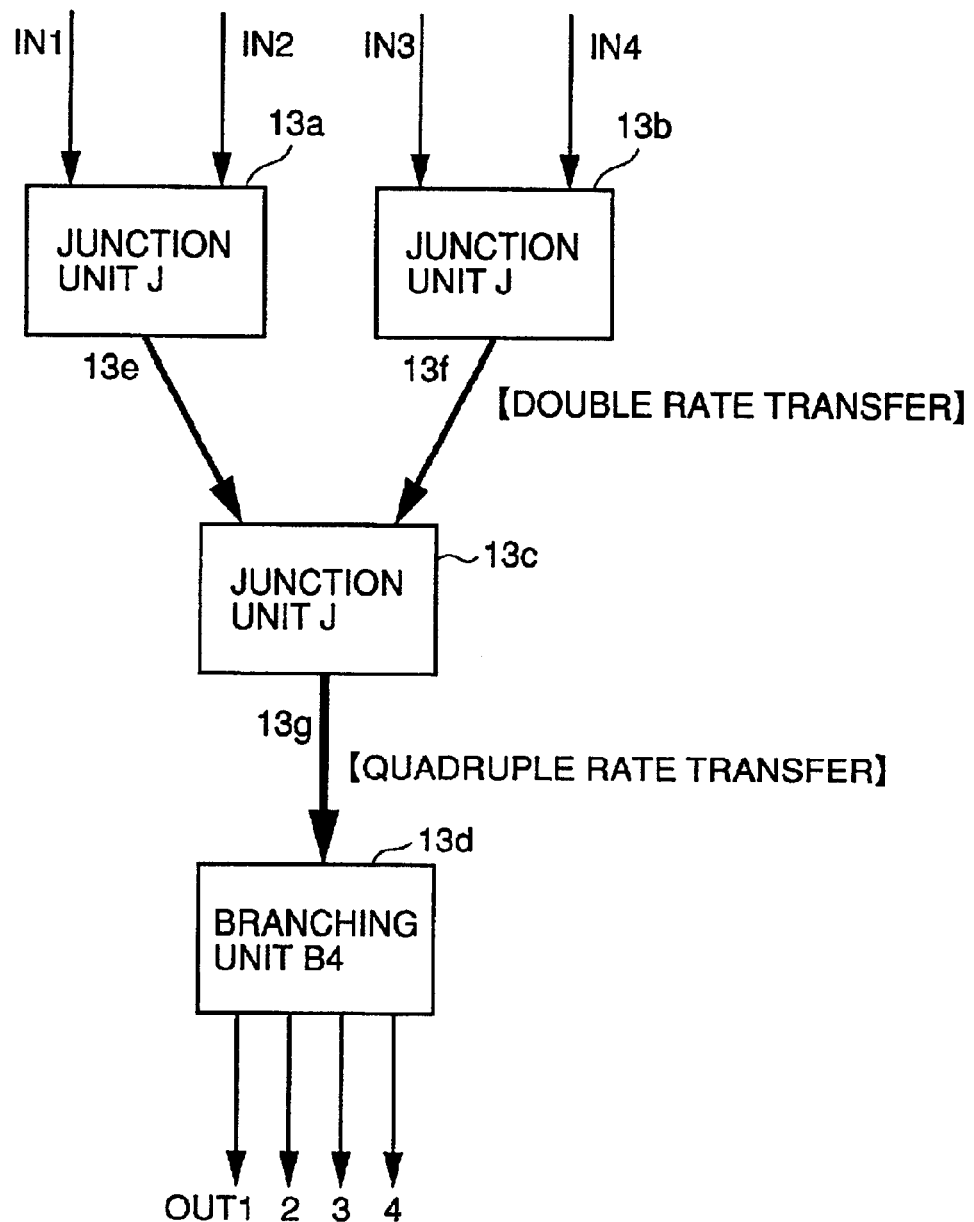
FIG. 2 is a block diagram showing a 4×4 quadruple rate transfer router in accordance with another embodiment of the present invention.

FIG. 2 is a block diagram of a 4×4 quadruple rate transfer router in accordance with another embodiment of the present invention. The router of the present embodiment provides 4×4=16 different paths, and it is a 4-input, 4-output router formed by the 1-input, 4-output branching unit 4 in the prior art FIG. 15 and three 2-input, 1-output junction units shown in FIG. 16. In the transfer section between each of the junction units 13a, 13b and 13c and the transfer section from junction unit 13c to branching unit 13d, the transfer rate is doubled.

In FIG. 2, the transfer rate of the path 13g is four times the input rate or the output rate of the router. More specifically, the delay element on the SEND output line in the C element of junction unit 13c and the amount of delay of the delay element on the SEND output line in the C element of junction unit 13d are adjusted (for example, the number of stages of the inverter in the delay element is reduced to one fourth the number of stages of the inverters in the delay element of C elements used in the data driven type processor), so that the transfer rate between the C element in the junction unit 13c and the C element in the branching unit 13d is four times the maximum transfer rate in the data driven type processor. Similarly, the transfer rate between the C element in junction unit 13a and the C element in the JCTL circuit of junction unit 13c, as well as the transfer rate between the C element in the junction unit 13b and the C element in the JCTL circuit of junction unit 13c are double the maximum transfer rate in the processor.

Referring to FIG. 2, the data input to junction unit 13a from IN1 and IN2 at the maximum transfer rate are joined with the maximum transfer rate. As the double rate transfer is realized, the data can be passed through path 13e without any problem and transferred to junction unit 13c. Similarly, the data input to junction unit 13b from IN3 and IN4 at the maximum transfer rate are passed through the path 13f and transferred at the double rate, to junction unit 13c. The four input data are joined at the junction unit 13c. As the transfer rate of the path 13g is four times the input rate or the output rate of the router, the data can be transferred to the branching unit 13d through path 13d with the transfer rate not lower than the maximum transfer rate. The four input data are branched to OUT1, OUT2, OUT3 and OUT4 at branching unit 13d. As the transfer rate of the C element in branching unit 13d is quadrupled rate, each data can be output at the maximum transfer rate.

Figure 3:
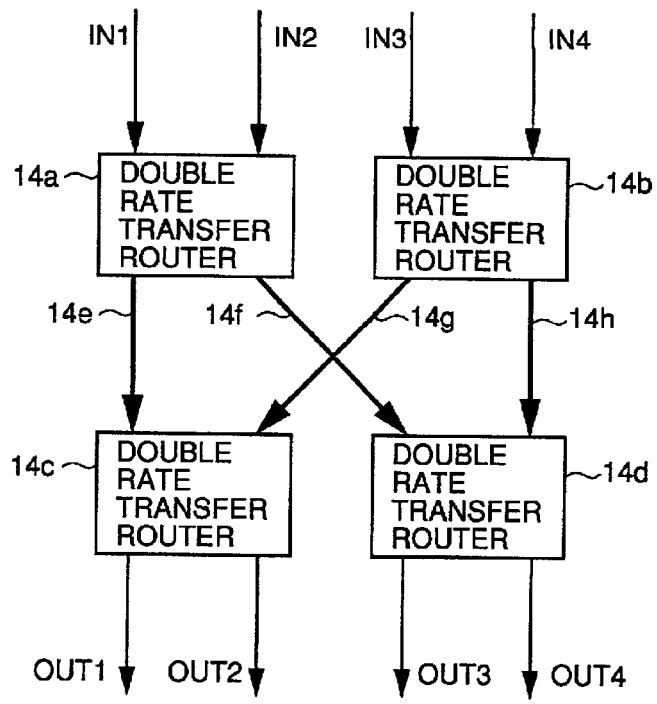
FIG. 3 is a block diagram showing a 4×4 router formed by the 2×2 double rate routers in accordance with a still further embodiment of the present invention.

FIG. 3 is a block diagram showing a 4×4 router formed by the 2×2 double rate transfer routers in accordance with a third embodiment of the present invention. In FIG. 3, the double rate transfer routers 14a, 14b, 14c and 14d are each the double rate transfer router shown in FIG. 1, and in the section of transfer from double rate transfer routers 14a, 14b to double rate transfer routers 14c and 14d, double rate transfer is utilized. The router provides 4×4=16 different paths. In FIG. 3, the transfer rate of paths 14e, 14f, 14g and 14h are made double the input rate or the output rate of the router.

More specifically, the transfer rate between the C element in the branching unit of double rate transfer router 14a and the C element in the JCTL circuit in the junction unit of double rate transfer router 14c, the transfer rate between the C element in the branching unit of double rate transfer router 14a and the C element in the JCTL circuit in the junction unit of double rate transfer router 14d, the transfer rate between the C element in the branching unit of double rate transfer router 14b and the C element in the JCTL circuit in the junction unit of double rate transfer router 14c and the transfer rate between the C element in the branching unit of double rate transfer router 14b and the C element in the JCTL circuit in the junction unit of double rate transfer router 14d are double the maximum transfer rate in the data driven type processor.

Referring to FIG. 3, when the data input from IN1 is to be routed to OUT2 and the data input from IN2 is to be routed to OUT1, for example, the data input from IN1 and IN2 at the maximum transfer rate are passed through double rate transfer router 14a and both are output from path 14e. Conventionally, it is not guaranteed by the router that two or more inputs provided simultaneously are output simultaneously from the same outputs. Here, as the transfer rate of path 14e is doubled, the data can be transferred to double rate transfer router 14c without any problem. Thereafter, the data are output, each at the maximum transfer rate, from OUT2 and OUT1, respectively.

Figure 15:
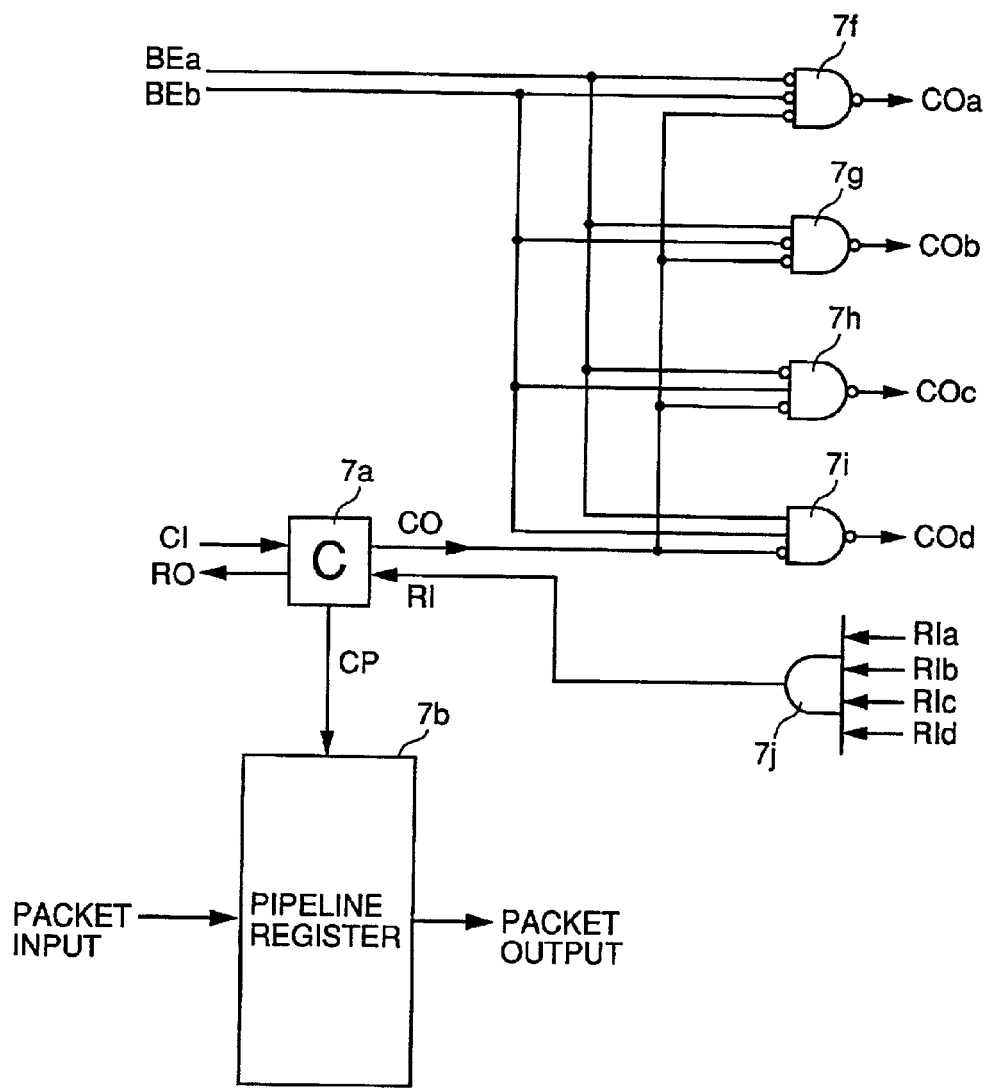
FIG. 15 is a circuit diagram of a 1-input, 4-output branching unit used in the router.
Figure 16:
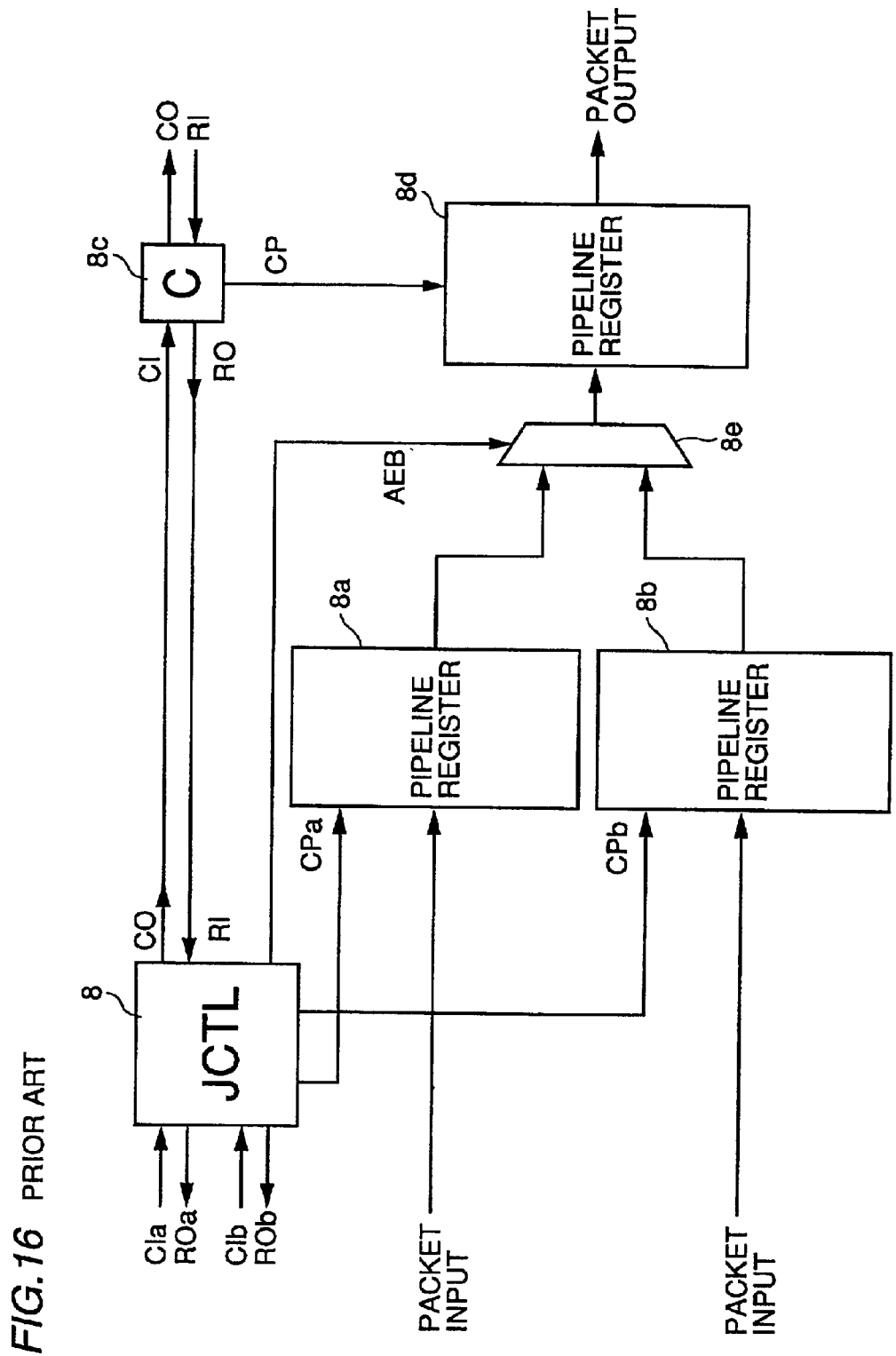
FIG. 16 is a circuit diagram of a 2-input, 1-output junction unit used in the router.
Figure 17:
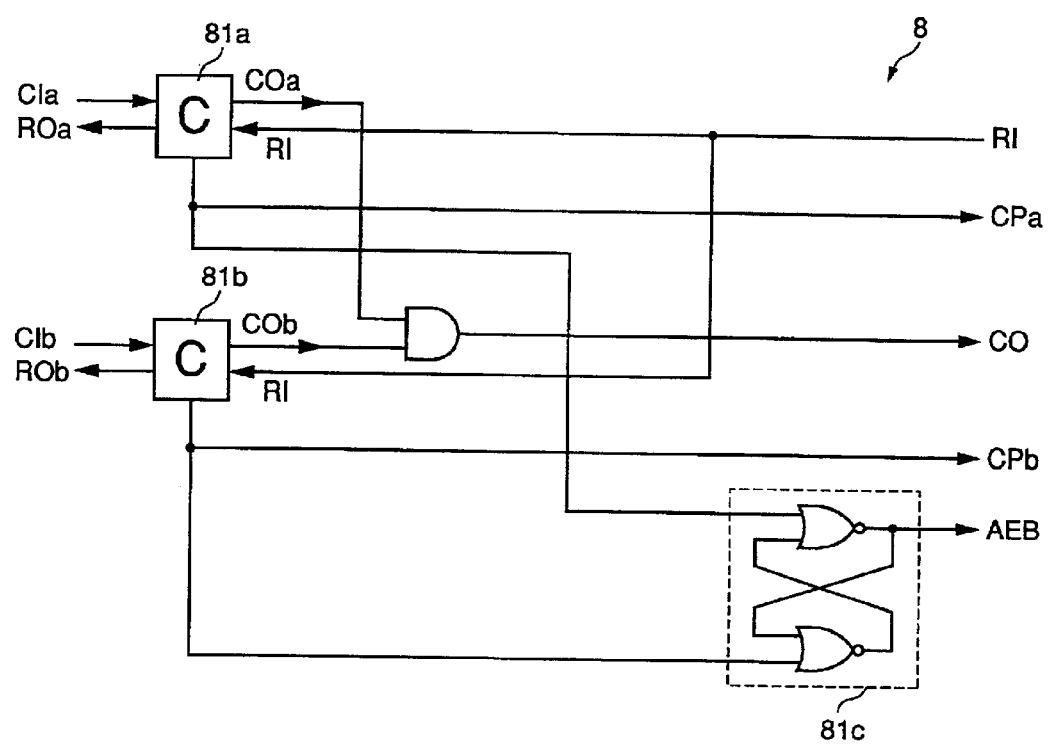
FIG. 17 is a circuit diagram of the JCTL circuit in the junction unit shown in FIG. 16.
Figure 18:
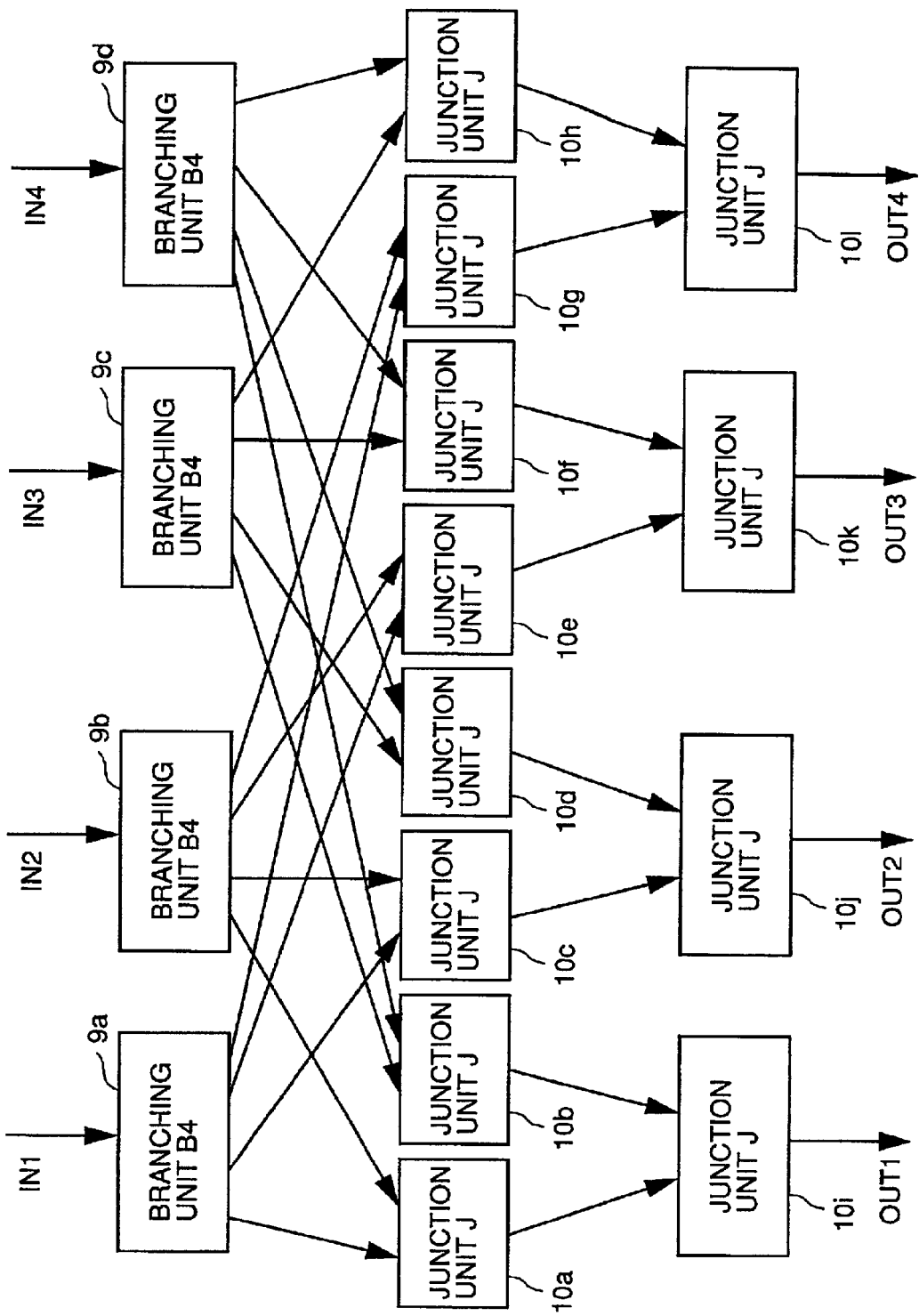
FIG. 18 is a block diagram showing a 4×4 router in accordance with the conventional method.
Figure 19:
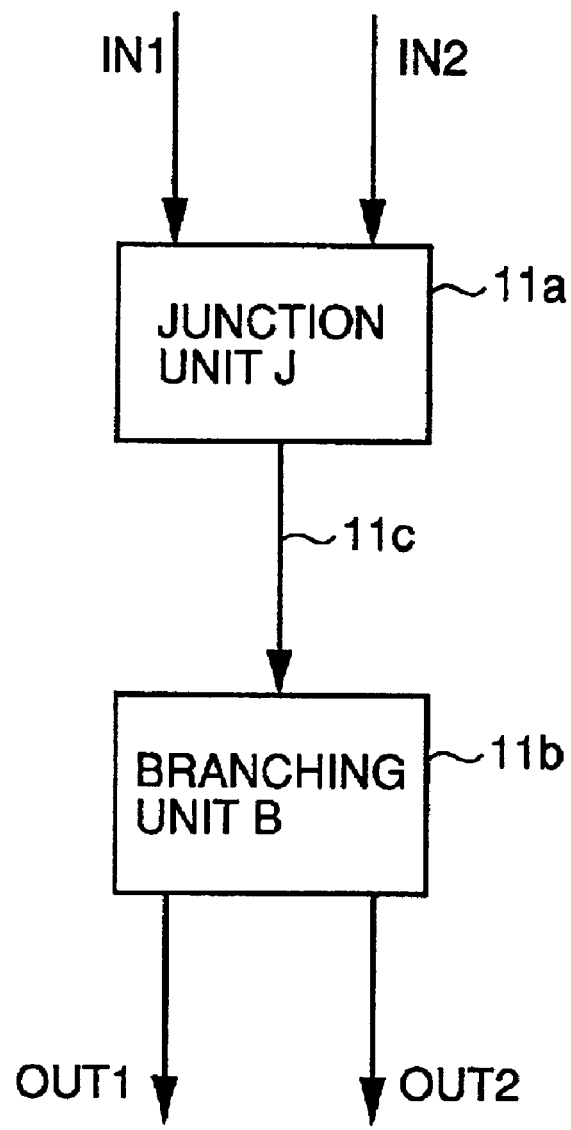
FIG. 19 is a block diagram showing a 2×2 router with a circuit scale made smaller in accordance with the conventional method.

The router shown in FIG. 18 described with reference to the prior art is formed by four 1-input, 4-output branching units shown in FIG. 15 and junction unit shown in FIG. 16, and in order to maintain 4×4=16 paths and the maximum transfer rate, the circuit scale was very large. When we compare the router shown in FIG. 18 and the router in accordance with the embodiments of the present invention, it can be understood that the circuit scale can be suppressed in such a router that uses the transfer rate corresponding to the total sum of the transfer rates of inputs to the router, or the transfer rate corresponding to the total sum of the transfer rates of the outputs from the router. More specifically, the circuit scale is the smallest in the quadruple state transfer rate router shown in FIG. 2, second smallest in the router formed by the double rate transfer router shown in FIG. 3 and the third smallest in the router formed by the conventional router method shown in FIG. 18. In the example utilizing the conventional router method shown in FIG. 18, the circuit scale is considerably larger than other routers.

Figure 4:
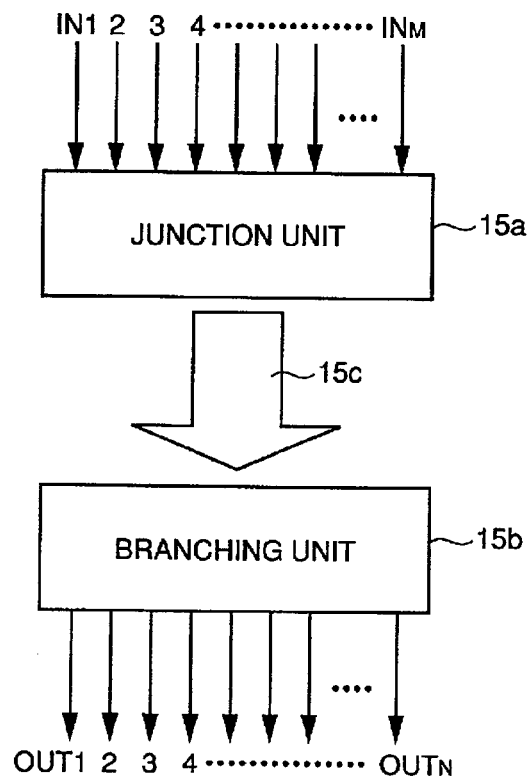
FIG. 4 is a block diagram showing an M×N double rate transfer router in accordance with a still further embodiment of the present invention.

FIG. 4 is a block diagram of an M×N rate transfer router in accordance with a still further embodiment of the present invention. Here, M and N are natural numbers not smaller than 2, M and N may or may not be the same, and M may be larger than or smaller than N. The router shown in FIG. 4 has M inputs and N outputs, and formed by a M-input, 1-output junction unit 15$a$ and a 1-input, N-output branching unit 15$b$. The junction unit 15$a$ is formed by (M−1) 2-input, 1-output junction units. The router provides M×N paths.

Referring to FIG. 4, when the relation between M and N is (M>N), the transfer rate of the path 15$c$ between junction unit 15$a$ and branching unit 15$b$ is the total sum of the transfer rates from input IN1 to INM. When inputs IN1 to INM all have the same transfer rate, the path 15$c$ will have M-times the transfer rate.

When the relation is (M<N), the transfer rate of the path 15$c$ between junction unit 15$a$ and branching unit 15$b$ will be the total sum of the transfer rates of outputs OUT1 to OUTN. For example, when outputs OUT1 to OUTN all have the same transfer rate, the path 15$c$ will have the N-times transfer rate. When the relation is (M=N), the transfer rate of the path 15$c$ between junction unit 15$a$ and branching unit 15$b$ may be M times or N times.

Figure 5:
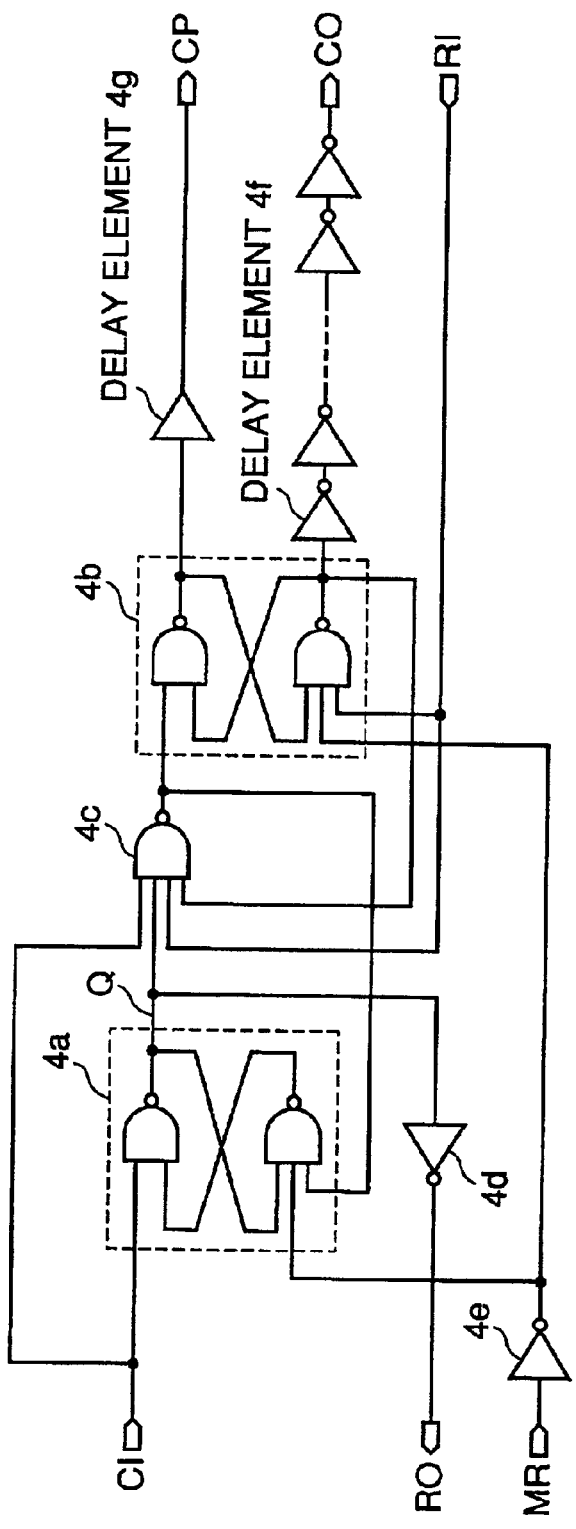
FIG. 5 is a circuit diagram of the C element used in the embodiment of the present invention.

FIG. 5 is a circuit diagram of the C element used in each of the embodiments of the present invention. The C element shown in FIG. 5 is the same as that described with reference to FIG. 10, while the number of stages of delay element 4$f$ refers embodiment by embodiment.

Figure 9:
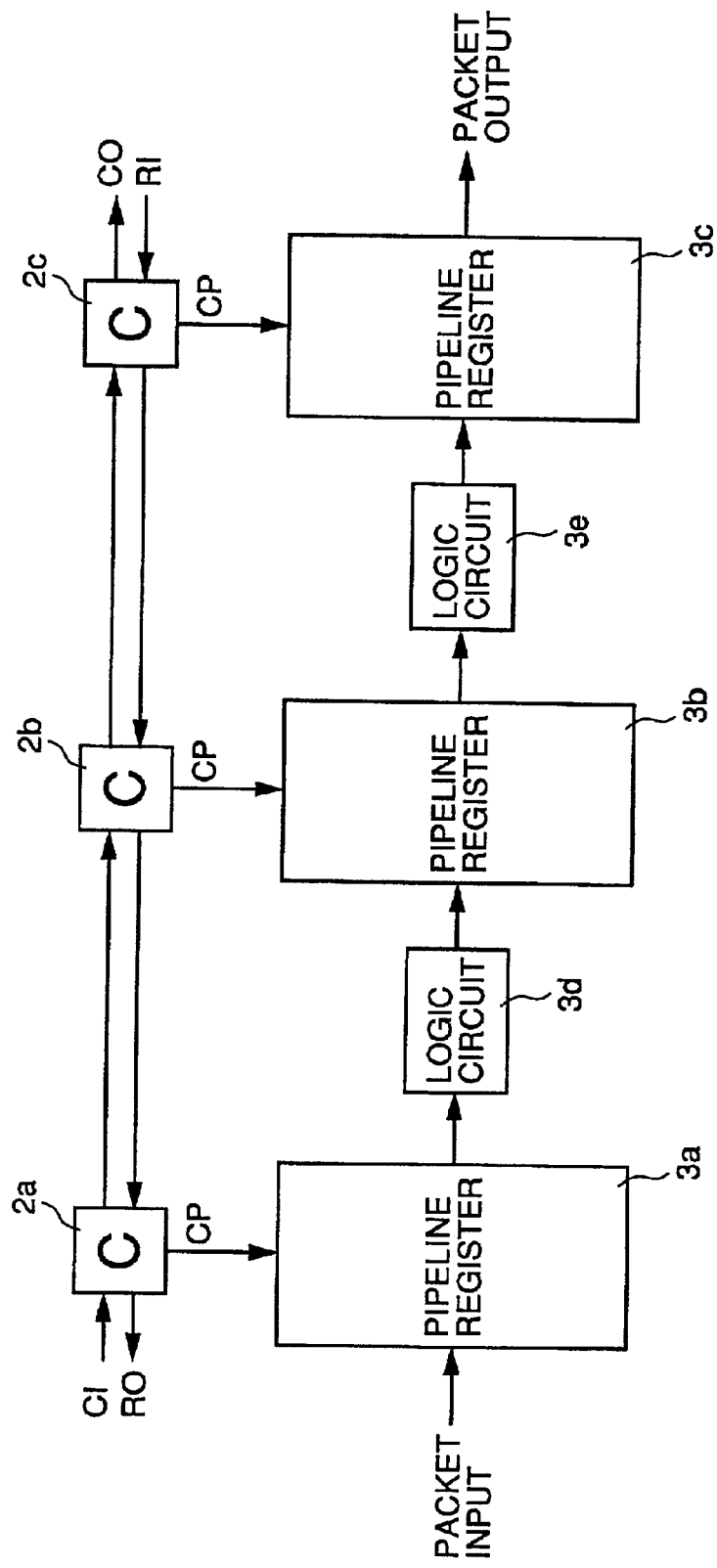
FIG. 9 is a block diagram showing a pipeline in the data driven type processor.
Figure 11:
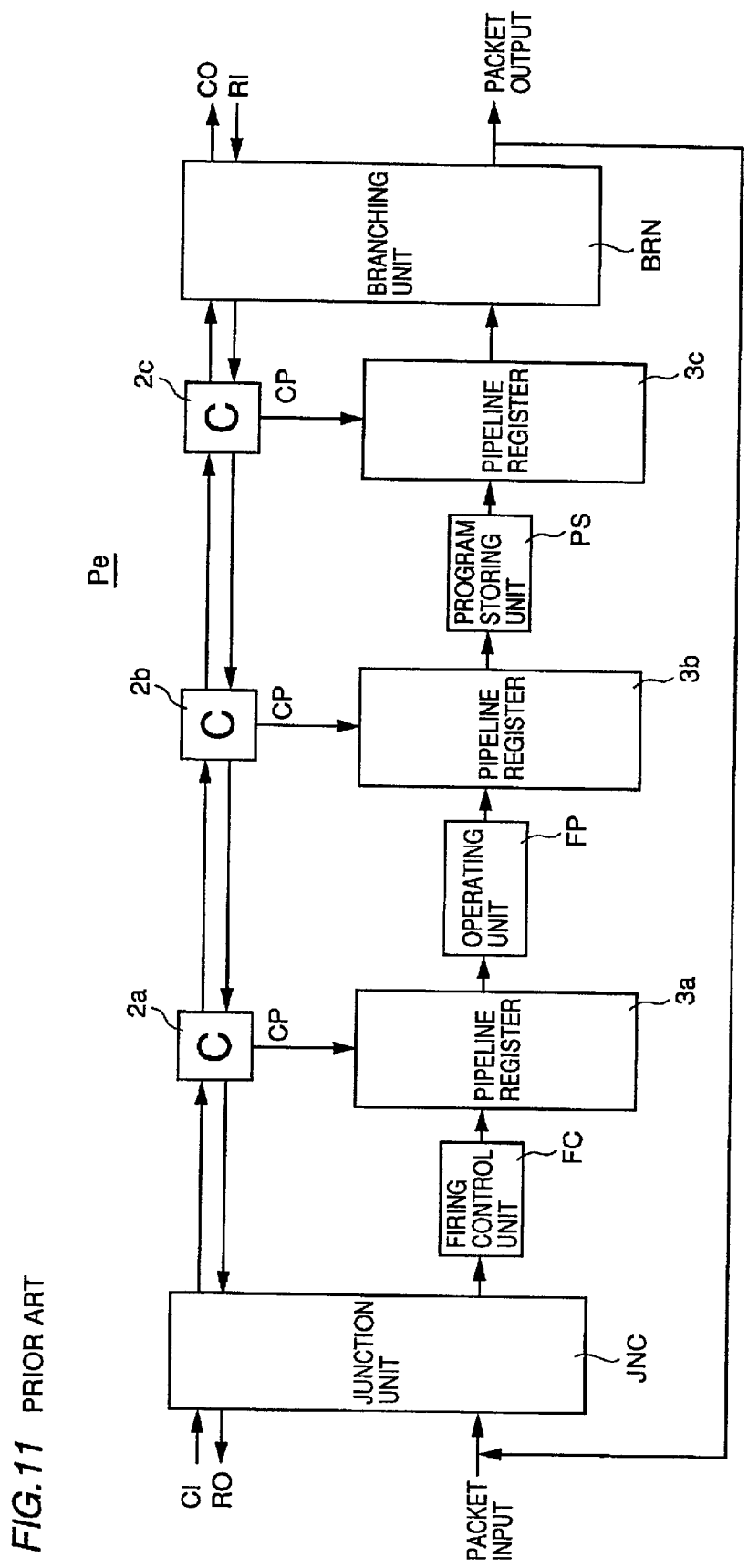
FIG. 11 is a block diagram of a data driven type processor.
Figure 12:
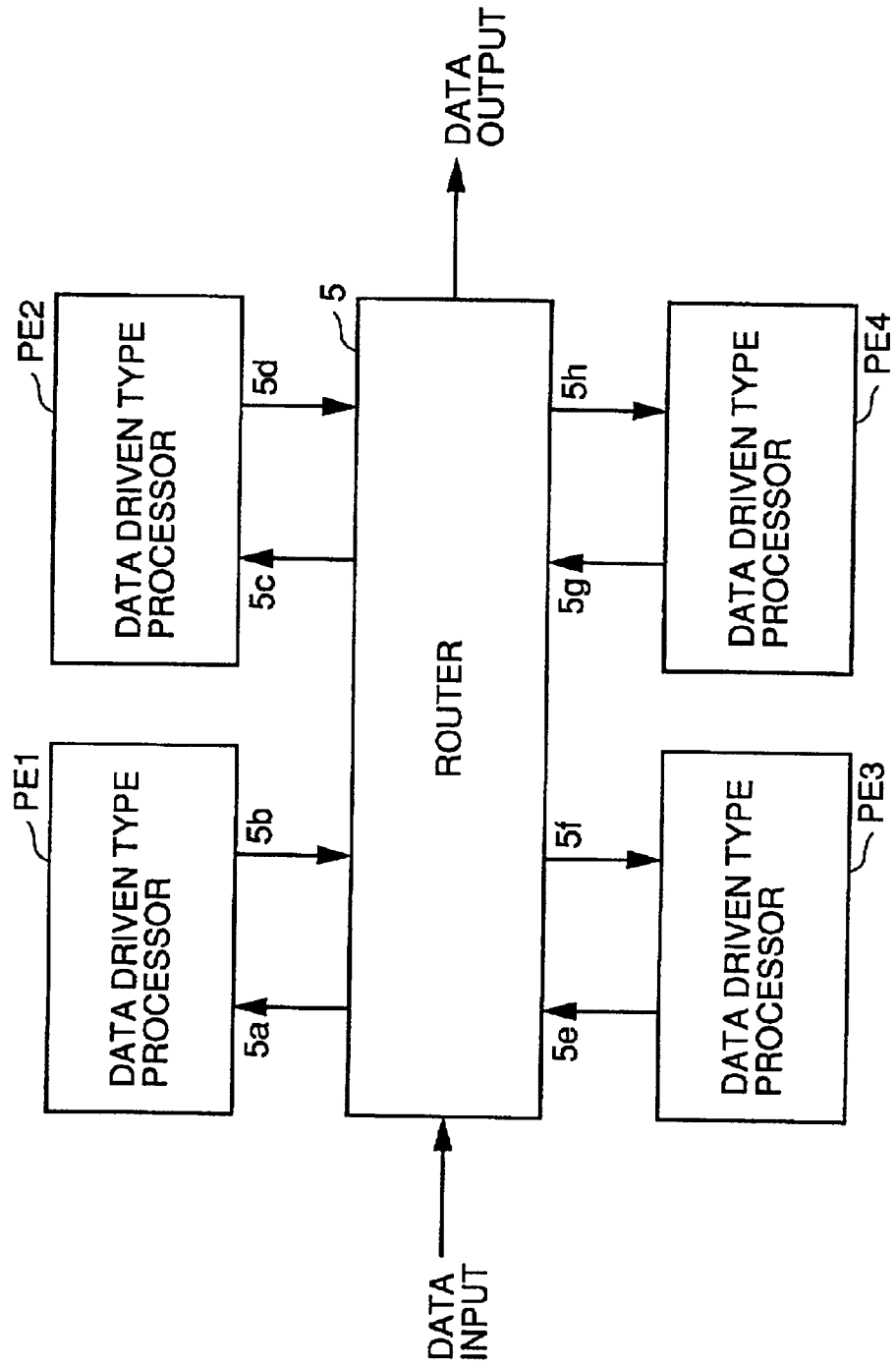
FIG. 12 shows an example of use of a conventional router.

When a signal at the "H" level is input to the RI terminal of the C element shown in FIG. 5 from the C element of a succeeding stage, indicating the transfer acknowledge state, the C element sets the control signal CP of the pipeline register to the "H" level, so that a data packet output from the preceding stage is held by the pipeline register formed by the D type flip-flop, and output to the succeeding stage. The data packet output from the pipeline register to the succeeding stage is subjected to prescribed processing by the logic or operating unit as shown in FIG. 9 or 11, and thereafter the resulting data packet is transferred and held in a pipeline register of the succeeding stage.

The structure of the C element or the pipeline register is relatively simple, and therefore, the time for processing or delay at these portions is short. By contrast, the logic unit and the operating unit have complicated circuit structures, and therefore the time for processing or the delay is considerably longer as compared with the time for processing or delay mentioned above. When data output from the pipeline register is completed and the CP signal of the C element attains to the "L", the C element must maintain CO at the "L" level to continue transfer request, to the C element of the succeeding stage, until the data is transferred to the pipeline register of the succeeding stage through the logic unit or the operating unit.

For this purpose, a delay element 4$f$ is provided in the C element. As already described, the time for processing or the delay in the logic unit or the operating unit is considerably longer than the time for processing or the delay in the C element or in the pipeline register. Therefore, when the delay element 4$f$ in the C element used in the data driven type processor is implemented by a serial connection of inverter circuits, the delay element would have ten to several tens of stages. Therefore, the number of stages of the series connected inverters in the delay element 4$f$ of the C element in the router in accordance with the embodiments of the present invention can be readily reduced to ½, ¼, 1/M or 1/N (where M and N are natural numbers) of the number of stages in the C element in the data driven type processor.

In the embodiment shown in FIG. 5, the delay element 4$f$ inserted to the side of the CO terminal has been described. Desired effects can also be attained when the element is inserted to the side of the CI terminal. It should be noted, however, that the present invention is applied not to the C element in the junction unit of the first stage but in the C elements of other routers. Though inverter circuits are used for the delay element, the delay element may be implemented by the delay provided by capacitance or resistance components, or by the combination thereof.

As described above, according to the embodiments of the present invention, the transfer rate used in the self-synchronous transfer control circuit in the router is made different from the transfer rate used in the system. Therefore, as compared with the conventional router method, a router can be formed with significantly smaller circuit scale as compared with the conventional circuit, while maintaining the maximum transfer rate in the data driven processor. As a result, the necessary cost can be reduced, and it can cope with larger number of processes and faster speed of processing that are expected in the future. Further, the router in accordance with the present invention can be implemented in a simple circuit structure, the circuit area for the router portion can be reduced and the router can be designed efficiently.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of controlling execution of a data driven type information processing apparatus including a router including an M-input, 1-output junction unit and a 1-input, N-output branching unit, controlling input/output of a data packet including at least a destination node number, an instruction code and data, and a self-synchronous transfer control circuit generating a transfer request signal and a transfer acknowledge signal controlling transfer and operating processes of said data packet, wherein a transfer rate used in the self-synchronous transfer control circuit of said router is set so as to be greater than the maximum transfer rate that can be used in said data driven type information processing apparatus, based on said maximum transfer rate.

2. The method of controlling execution of a data driven type information processing apparatus according to claim 1, wherein the transfer rate used in said self-synchronous transfer control circuit of said router is a multiplication of the transfer rate used in said system.

3. The method of controlling execution of a data driven type information processing apparatus according to claim 1, wherein the transfer rate used in said self-synchronous transfer control circuit of said router is a total sum of transfer rates of inputs to said router.

4. The method of controlling execution of a data driven type information processing apparatus according to claim 1, wherein the transfer rate used in said self-synchronous transfer control circuit of said router is a total sum of transfer rates of outputs from said router.

5. The method of controlling execution of a data driven type information processing apparatus according to claim 1, wherein the transfer rate used in said self-synchronous transfer control circuit of said router is the larger one of the total sum of the transfer rates of the inputs to said router and the total sum of the transfer rates of the outputs from said router.

6. A data driven type information processing apparatus, comprising:

a router including an M-input, 1-output junction unit and a 1-input, N-output branching unit, controlling input/output of a data packet including at least a destination node number, an instruction code and data; and a self-synchronous transfer control circuit generating a transfer request signal and a transfer acknowledge signal controlling transfer and operating processes of said data packet, wherein a transfer rate used in the self-synchronous transfer control circuit of said router is set so as to be greater than the maximum transfer rate that can be used in said data driven type information processing apparatus, based on said maximum transfer rate.

7. The data driven type information processing apparatus according to claim 6, wherein the transfer rate used in said self-synchronous transfer control circuit of said router is a multiplication of the transfer rate used in said system.

8. The data driven type information processing apparatus according to claim 6, wherein the transfer rate used in said self-synchronous transfer control circuit of said router is a total sum of transfer rates of inputs to said router.

9. The data driven type information processing apparatus according to claim 6, wherein the transfer rate used in said self-synchronous transfer control circuit of said router is a total sum of transfer rates of outputs from said router.

10. The data driven type information processing apparatus according to claim 6, wherein the transfer rate used in said self-synchronous transfer control circuit of said router is the larger one of the total sum of the transfer rates of the inputs to said router and the total sum of the transfer rates of the outputs from said router.

11. The data driven type information processing apparatus according to claim 10, wherein a plurality of said routers are combined.

* * * * *